Oct. 20, 1925.

C. H. WHITE

DISK HARROW

Filed Jan. 26, 1920

Witness;
E. Wilderson

Inventor;
Charles H. White
by H. H. Bliss
Attorney.

Patented Oct. 20, 1925.

1,558,321

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK HARROW.

Application filed January 26, 1920. Serial No. 354,011.

*To all whom it may concern:*

Be it known that I, CHARLES H. WHITE, a citizen of the United States, residing at Moline, in the county of Rock Island and State of Illinois, have invented certain new and useful Improvements in Disk Harrows, of which the following is a specification, reference being had therein to the accompanying drawing.

This invention relates to disk harrows and particularly to the type of disk harrows that works the soil twice at each traverse of the field. Implements for this purpose are commonly referred to as double action disk harrows and are characterized by having two sets of disk gangs pivotally coupled together, one set of disk gangs behind the other, usually the disks of the forward gangs being arranged to throw the soil outwardly while the disks of the rearward gangs are arranged to throw the soil inwardly, thus leaving the soil in a substantially level condition after the passage of the implement thereover. As the quality of work performed by such an implement depends to a considerable extent upon the proper positioning of the disks of the rearward gangs relative to those of the forward gangs, it is an object of the invention to provide means for regulating the path that will be traveled by the rearward gangs so that the disks thereof will cut the middles left between the disks of the forward gangs.

It is also an object of the invention to provide means normally acting to prevent either the forward or rearward set of gangs from slewing or drifting relative to the other, yet so arranged as to permit of relative movement between the forward and rearward sets of gangs as when turning at corners or at the ends of field traverses.

Other objects of the invention will be apparent from a reading of the accompanying specification, drawings and claims.

Of the drawings, in which the preferred form of the invention is illustrated and in which like numerals indicate identical parts.

Figures 2, 3, 4, 6:
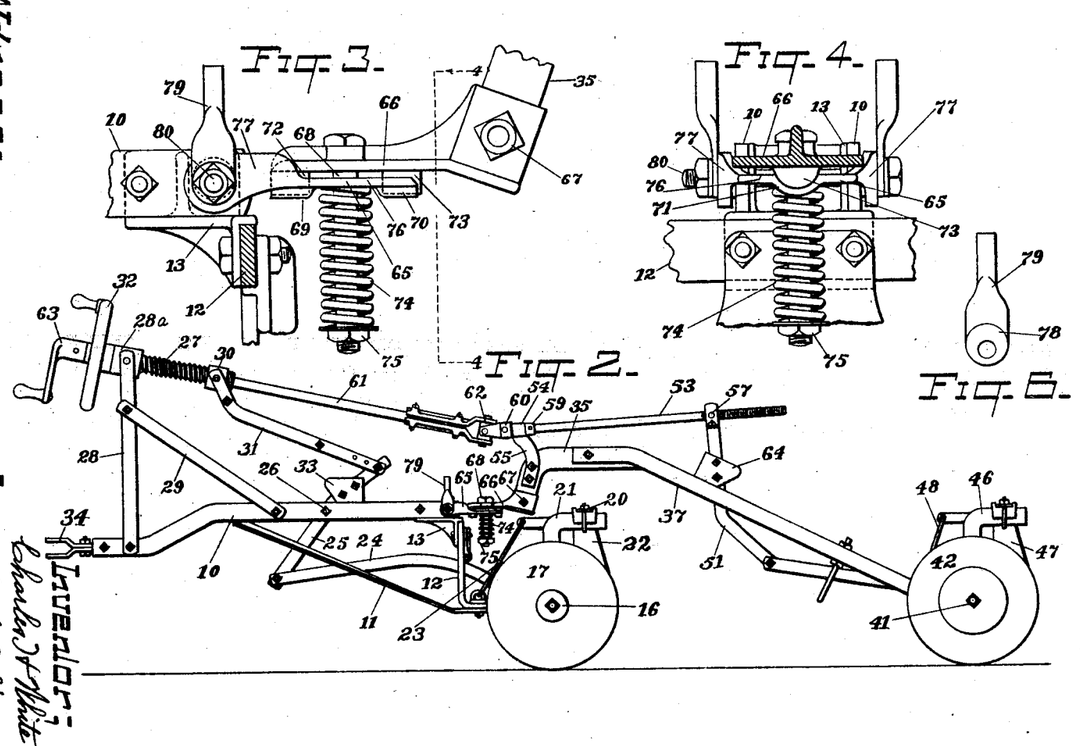
Figure 2 is a side elevation of the machine as shown in Figure 1.
Figure 3 is an enlarged detail of the pivot joint and its associated parts for connecting together the forward and rearward sets of gangs.
Figure 4 is a transverse vertical section on the line 4—4 of Figure 3.
Figure 6 is a detail view of one of the eccentric adjusting devices.

Referring to the drawings, 10—10 indicate spaced parallel bars forming the main draft member of the front draft frame. Secured to the bars 10—10 are frame bars 11—11 that extend rearwardly and diverge outwardly and downwardly, their rear ends joining the horizontally turned end portions of an arched transverse frame bar 12, the transverse bar 12 being connected with the draft member 10—10 by a suitable bracket 13 as best seen in Figure 3.

Pivotally and slidably connected with the end portions of the frame bars 11 and 12 as indicated at 14 is a bearing 15 in which is revolubly mounted a shaft 16, there being fixed to the latter transversely spaced, concave-convex disks 17. Each disk carrying shaft 16 is provided with an outer bearing 18 and an inner bearing 19. At 20 there is a scraper carrying bar supported on arms 21 extending upwardly from the bearings 15—18 and 19. 22 are scrapers mounted on the bar and adapted to engage with the concave faces of the disks 17. 23 indicates a bracing means extending between the end portion of the bars 11—12 and the center arm 21 for holding the scraper frame in position.

The set of parts at either side of the machine consisting of the shaft 16, disks 17 and the bearings 15—18 and 19 together with their associated parts are each considered a gang.

The inner disk 17 of each gang is provided on its convex face with a suitable bumper to receive the end thrust of the opposing gang as is usual in disk gangs of this type.

The cutting positions of the disk gangs are controlled, or the gangs may be adjusted into their non-cutting positions, as shown in the drawings, by links 24—24, pivotally connected as at 24ᵃ with the inner bearings 19—19 of each gang, the forward ends of the links being pivotally connected with a lever 25 pivoted at 26 between the draft bars 10—10.

In the construction illustrated, the lever 25 is operated by a threaded member 27 journaled in a bearing 28ᵃ the latter being supported from the main draft frame by braces 28—28 and 29—29; a nut 30 mounted on the threads of the member 27 is connected with the lever 25 by a link 31 so that as the threaded member is turned by its actuating device, which is preferably in the form of a hand-wheel 32, the nut will feed along the threaded portion and move the inner ends of the gangs backward or forward dependent upon the direction the hand-hold 32 is rotated. A stop 33 is secured to the lever 25 in position to engage one of the draft bars 10 in either of the extreme positions of adjustment of the gangs. A clevis is indicated at 34 secured to the front portion of the main draft frame to receive the draw bar of a tractor or the draft devices of any suitable drawing means.

Figures 1, 5:
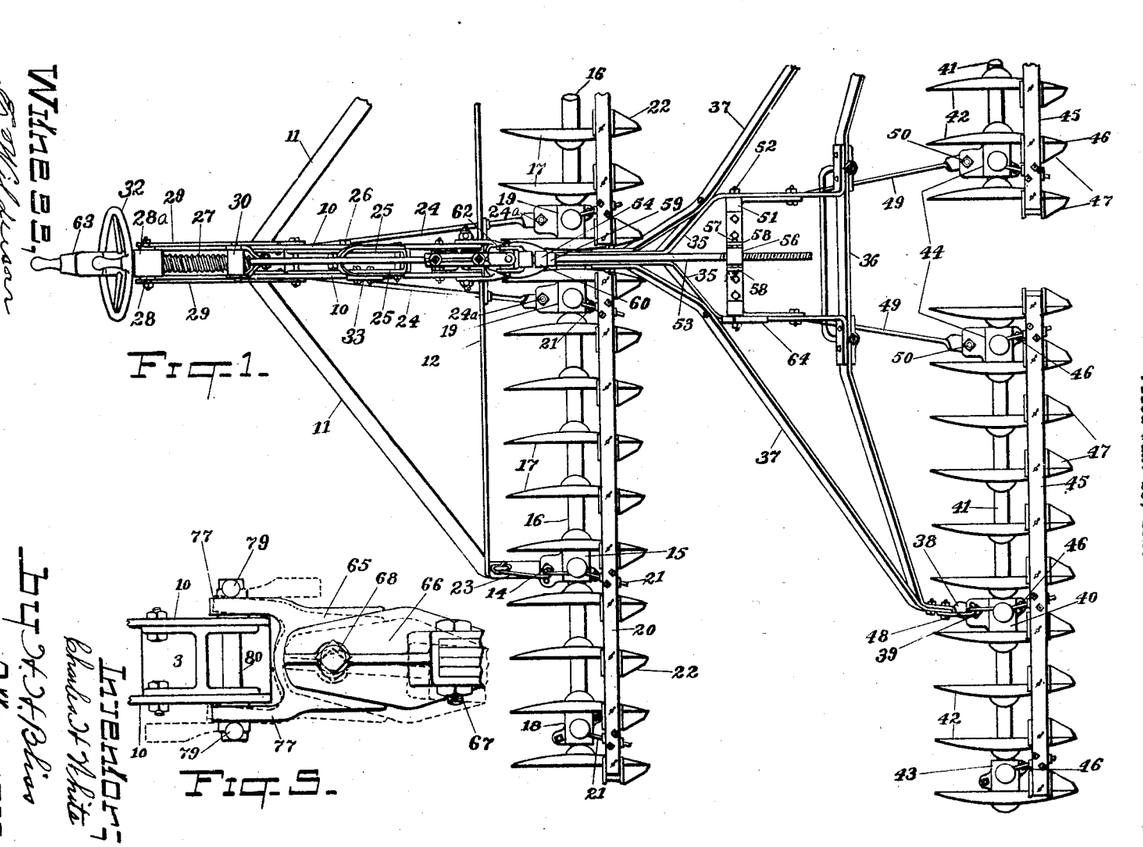
Figure 1 is a plan view, the disk gangs being shown adjusted to transverse alinement, the outermost ends of the gangs at one side being broken away.
Figure 5 is a detail plan view of the parts seen in Figure 3, the adjustment of the parts being indicated by dotted lines.

The rear harrow comprises a main draft frame formed of bars 35—35 having their forward portions secured together, their rear portions being separated and secured to a transverse frame bar 36 as best seen in Figure 1. At 37 there are brace bars secured at their forward ends to the main draft bars 35 and diverging outwardly and downwardly to their juncture with the transverse frame bar. The transverse frame bar 36 at each of its ends has a portion turned as indicated at 38 to pivotally connect at 39 with a bearing 40 in each of which is revolubly mounted a shaft 41, there being fixed to the latter, transversely spaced, concavo-convex disks 42. Each disk carrying shaft is provided with an outer bearing 43 and an inner bearing 44. 45 is a scraper carrying bar supported on arms 46 extending upwardly from the bearings 40, 43 and 44. Scrapers are indicated by 47 which are mounted on the bar and adapted to engage with the concave faces of the disks 42. There is a bracing means 48 for holding the scraper frame in position.

The set of parts at either side of the machine consisting of the shaft 41, disks 42 and the bearings 40, 43 and 44 together with their associated parts may each be considered a gang.

The cutting positions of the rear pair of disk gangs are controlled, or the gangs may be adjusted to their non-cutting positions as shown in the drawings, by links 49—49, pivotally connected as at 50 with the inner bearings 44—44 of each gang, the forward ends of the links being pivotally connected with a U-shaped lever 51, pivoted at 52 between the separated ends of the frame bars 35—35. In the construction illustrated, the lever 51 is operated by a threaded member 53 carried in a bearing 54, the latter being supported from the frame bars 35—35 by an upstanding arm 55. A nut 56 mounted upon the threads of the member 53 is pivotally supported at 57 between lugs 58—58 secured to the lever 51 so that as the threaded member 53 is turned the nut 58 will feed along the threaded portion and move the inner ends of the gang forward or backward dependent upon the direction of rotation of the member 53, it being understood that the member 53 is held from endwise movement through its bearing 54 by reason of collar 59 at the rear of the bearing and collar 60 at the front thereof. The member 53 is loosely or rockingly supported in the bearing 54 so its rear end may rise and fall with the stroking of the lever 51. The member 53 is rotated by a shaft 61, the two being connected by a universal coupling 62, the shaft 61 extending through and being rotatably supported in the forward member 27 and having an actuating device, preferably in the form of a hand crank 63. A stop 64 is secured to the lever 51 in position to engage one of the frame bars 35 in either of the extreme positions of adjustment of the rear gangs.

It will be noted the universal coupling 62 is directly over the pivotal connection between the harrow frames, hereinafter described, and therefore the rear gang adjusting device may be readily operated regardless of the relative positions of the gang frames.

In order that harrows of this class may be turned at corners and at the ends of field traverses a pivotal relationship is necessary between the main front frame and the rear frame, but if this were a free acting pivot the rear gangs and their frame would drift relatively to the front gangs and their frame if the implement were being used on hillsides or sloping ground. Such drifting or slewing is undesirable as it results in gaps in the double disking of the ground, that it to say, the swerving of the rear gangs to one side of the paths traversed by the front gangs leaves spaces that have been passed over by only one set of disks and the soil in such spaces is not thoroughly worked and the surface is not level, as it is when it is double disked. Furthermore, a free acting pivot between the gang frames permits the rear frame and its gangs to swerve slightly from its course when the harrow is being used on level ground, sufficiently for the rear disks to trail in the furrows opened by the disks of the front gangs, whereas it is desirable to hold the rear gangs of disks in such position with respect to the front gangs that the rear disks will split the middles between the furrows cut by the disks of the front gangs.

To prevent this drifting and trailing and to provide for positioning the disks of the rear gangs properly with respect to those of the front gangs, the transversely adjustable, yielding locked pivot means disclosed in the drawings was devised for coupling the gang draft frames.

The coupling between the gang frames comprises a plate like member 65 connected to the central rear portion of the front draft frame 10—10, in a manner hereinafter described, and extending rearwardly therefrom substantially in the median line of the harrow, a plate like member 66 secured at 67 to the downwardly turned front portion of the rear draft frame 35—35 and projecting forwardly therefrom to overlie the member 65, and a coupling pin such as bolt 68 also located substantially in the median line of the harrow and extending through vertically alined openings in the members 65 and 66. The top face of plate member 65 is provided with a depression 69 in front of the coupling pin aperture and a similar depression 70 in the rear of the aperture, the two depressions being in longitudinal alinement and having curved side walls as indicated at 71 in Figure 4. The bottom face of plate member 66 is provided with a downwardly projecting lug 72 in front of the coupling pin aperture and a similar lug 73 in the rear of the aperture the two lugs being in longitudinal alinement and having curved faces to correspond with side walls of the depression. A spring 74 is mounted on the coupling bolt 68 underneath the plate member 65 and acts to hold the plate members 65 and 66 in yieldingly locked engagement with each other, the tension of the spring being regulated by coupling bolt nut 75.

Normally or in straight away work any tendency for one of the gangs to drift or slew out of alinement relative to the other gang is resisted by the locking effect resulting from the spring clamped lugs 72—73 contacting with the depressions 69—70, they at this time being alined and in engagement, but if considerable pivotal force is exerted as when the tractor or draft animals turn the implement at corners, the pressure established between the faces of the lugs and the walls of the depressions by the turning force will act to spread the plate members apart against the tension of the spring 74 until the lugs disengage from the depressions, whereupon the turning of the implement is readily accomplished, the lugs at this time contacting with the flat top surface 76 of the plate member 65. After the implement is turned and a straight course is again established, the lugs and depressions again come into alinement and the tension of the spring 74 acts to yieldingly lock them in such position. It will be evident from the foregoing that the front and rear harrow units, comprising respectively the front frame with its two gangs and the rear frame with its two gangs, are pivotally connected together so that they may swing laterally relatively to each other, by draft connections in the form of the coupling members 65, 66 connected by the pivot bolt 68, and that said coupling members constitute spring actuated stabilizing devices that tend to hold the harrow units in normal relation to each other. It will also be noted that when the harrow units are turned angularly relatively to each other, by reason of the movement of the lugs 72, 73 out of the depressions 69, 70 the spring 74 is put under greater tension, thereby increasing the spring power applied to said spring actuated devices that is effective to restore said units to their normal relation to each other.

In order to position the rear harrow unit transversely with respect to the front harrow unit so that the disks of the rear gangs will split the middles between the furrows cut by the disks of the front gangs the coupling or pivotal connection between the disk gang frames of said harrow units is arranged to be transversely adjustable in a manner that will now be described.

The plate member 65 has forwardly extended ears 77—77 that lie outside the front draft frame bars 10—10, as best seen in Figure 5, the ears having transversely alined openings to receive the eccentric bearing portion 78 of adjusting studs 79—79, the latter being pivotally mounted on a transversely positioned bolt 80 passing through the bars 10—10. By mounting the ears 77—77 on the eccentric bearing portions 78 when the studs are turned on the bolt 80 the eccentric bearings 78 shift the ears and the plate 65, consequently if one stud is turned forwardly and the other rearwardly, as indicated in dotted lines in Figure 5, the plate 65 will be swung transversely. By rocking the studs 79 to the required extent the vertical pivot 68 can be accurately adjusted toward one side or the other to position the rear frame relatively to the front frame so that the disks of the rearward gangs will cut the middles between the furrows cut by the disks of the forward gangs. When adjusted to the desired position the bolt 80 is tightened to clamp the studs 79—79 securely to the frame bars 10—10. In making such adjustment it is not necessary to move the pivot 68 to any great extent away from the median line of the harrow, since lateral movement of the pivot is magnified in being translated to the disks of the rear harrow unit, owing to the distance between such disks and said pivot. Notwithstanding such adjustment, therefore, the pivot 68 is always substantially or approximately in the median line of the harrow, though not always absolutely so. The adjustment thus provided for is important, because it frequently occurs, owing either to inaccuracy of manufacture, or to the distortion of parts incident to use of the harrow, that the disks of the rear unit become displaced to a greater or less extent from the position in which they should be set so that they will split the middles between the furrows cut by the disks of the gangs of the front unit, and therefore are likely to drop into the furrows left by such front disks, leaving the middles unturned. This is particularly apt to occur in straightening out the harrow after a turning movement, since the line of least resistance for the rear disks is to run in the furrows made by the corresponding front disks, and the walls of such furrows tend to prevent the rear disks from assuming their proper position between such furrows. In many cases, therefore, it becomes necessary to adjust the normal operating position of the rear unit transversely relatively to the front unit to bring the rear disks into the right position, and the means above described for adjusting the coupling devices or draft connections laterally enables this to be easily accomplished. The adjustment described does not change the angular relation of the coupling members 65, 66 to each other, although it moves the vertical pivot 68 laterally and inclines the longitudinal axis of the coupling as a whole somewhat to the median line of the front harrow unit, and consequently similarly inclines the median line of the rear unit to that of the front unit when the parts are in their normal working position, but the tension of the spring 74 is sufficient to hold the coupling members 65, 66 in their normal relation to each other on straight away work, notwithstanding such adjustment. Obviously, any distortion that displaces the disks of the rear unit laterally also affects the angular position of the disks of the rear gangs with relation to the line of travel of the harrow, but this may be compensated for by the adjustment described by which the rear disks may not only be returned to position to cut the middles, but also returned to the angular position in which they were set prior to displacement by such distortion. In traveling over rough ground either set of gangs and its draft frame can rise or fall relatively to the other set of gangs and its frame by reason of the horizontal pivot formed by the ears 77—77 mounted on the bearings 78 which provides the necessary flexibility for such conditions, and either set of gangs and its draft frame can also rock relatively to the other set of gangs and its draft frame by reason of the longitudinal pivot formed by the rounded or curved faces of the depressions 69—70 and the lugs 72—73, the apertures in the plate member 65 for the coupling bolt 68 being slightly elongated transversely to permit the coupling bolt to swing in response to such rocking forces.

In the structure illustrated the devices for adjusting the cutting angle of the gangs are arranged to be conveniently operated from the front of the harrow or from the tractor if such draft means be employed for drawing the implement, and from the foregoing description it will be apparent that the cutting angles of the front and rear pairs of gangs can be separately adjusted by separately actuating the crank 63 and the hand wheel 32. Moreover, as the hand wheel 32 with its threaded sleeve 27 is positively connected with the front pair of gangs by means of the lever 25, links 24 and 31, and nut 30, the cutting angle of said gangs may be positively adjusted in either direction by rotating said hand wheel, and in like manner, as the crank 63 and shaft 61 are connected with the rear pair of gangs by the shaft 53, the universal coupling 62, the lever 51, nut 56, and links 49, the cutting angle of the rear gangs may be positively adjusted in either direction by rotating said crank. The shaft 53 is held against endwise movement by the collars 59, 60 at opposite sides of the bearing 54, so that by reason of its screw connection with the lever 51 it serves to constantly hold said lever in any position to which it may be adjusted, and as these parts are mounted on and are supported entirely by the rear frame and swing with it, angular adjustment of the rear frame or section relatively to the front frame or section does not affect the angular adjustment of the rear gangs with relation to each other. The devices for adjusting the cutting angle of the front gangs are supported entirely by the front frame, and the shaft 61 by which the shaft 53 is rotated to adjust the cutting angle of the rear gangs is also supported by the front frame, but as the shaft 61 is connected with the shaft 53 by the universal coupling 62 arranged directly over the pivot 68, when the angular relation to each other of the front and rear frames or sections is altered in any of the ways provided for by the construction described, it has no effect on the operating devices or connections by which the cutting angles of the gangs are controlled. The shaft 61 serves merely as a power or actuating device for rotating the shaft 53, and has nothing to do with holding the rear gangs in any position to which they may be adjusted, as the end thrust on the shaft 53 is taken up by the bearing 54 on the rear frame and is not transmitted to the shaft 61. The operating devices shown and described for adjusting the cutting angles of the gangs are therefore well adapted for use in a tandem disk harrow in which the front and rear frames are pivotally connected together by means comprising the adjustable and yielding lock mechanism shown and described, but I wish it to be understood that they may also be applied to such harrows in which some other suitable form of pivotal connection is provided between the frames to enable them to be swung laterally to vary their angular relation to each other. Also, so far as my improved adjustable and yielding lock mechanism is concerned, any suitable means may be employed for adjusting the cutting angles of the gangs, since while I prefer to use the devices shown, it will be manifest that the levers 25—51 can well be of the ordinary hand operated type common to horse drawn harrows, for the advantage of my adjustable and yielding lock between the gang frames may be realized in a horse drawn disk harrow of the double action type, as well as in the harrow illustrated, which is adapted to be drawn by a tractor.

So far as I am aware, I am the first in the art to provide a tandem disk harrow comprising front and rear units having draft connections between them arranged to permit angling thereof relatively to each other, with spring actuated devices which tend to hold the harrow units in normal relation to each other, and I wish it to be understood that my invention is not restricted to the construction illustrated and described, but includes such modifications thereof embodying the generic feature of utilizing spring actuated stabilizing devices as would occur to those skilled in the art. The generic feature of providing unitarily mounted independently operable means, or concentric devices, mounted on one of the frames of a tandem disk harrow and separately operable to adjust the sets of gangs of the two harrow units is not herein claimed, as it is the invention of Herbert B. McKahin who has made application for Letters Patent therefor.

What I claim is—

1. In a disk harrow, the combination of front and rear frames pivotally connected together for angular swinging relatively to each other about a vertical axis, and yielding means normally holding said frames against such angular swinging in either direction from their normal position, said means being operable by steering force tending to change the line of travel of the harrow to permit such swinging.

2. In a disk harrow, the combination of front and rear frames pivotally connected together for angular swinging relatively to each other about a vertical axis, and to swing vertically relatively to each other about a horizontal axis, and yielding means normally holding said frames against such angular swinging in either direction from their normal position, said means being operable by steering force tending to change the line of travel of the harrow to permit swinging of said frames about a vertical axis.

3. In a disk harrow, the combination of front and rear frames pivotally connected together for angular swinging relatively to each other about a vertical axis, and to rock relatively to each other about a longitudinal axis, and yielding means normally holding said frames against such angular swinging in either direction from their normal position, said means being operable by steering force tending to change the line of travel of the harrow to permit such swinging.

4. In a disk harrow, the combination of front and rear frames pivotally connected together for angular swinging relatively to each other about a vertical axis, to swing vertically relatively to each other about a horizontal axis, and to rock relatively to each other about a longitudinal axis, and yielding means normally holding said frames against such angular swinging in either direction from their normal position, said means being operable by steering force tending to change the line of travel of the harrow to permit swinging of said frames about a vertical axis.

5. A disk harrow comprising in combination a front frame, disk gangs connected with said frame, a rear frame, disk gangs connected with said rear frame, a vertically swinging member connected with one of said frames, a vertical pivot connecting the other frame with said member substantially in the median line of the harrow, and yielding means normally holding said frames against lateral swinging in either direction about said pivot but permitting said swinging in response to steering force tending to change the line of travel of the harrow.

6. A disk harrow comprising in combination a front frame, disk gangs connected with said frame, a rear frame, disk gangs connected with said rear frame, a vertical pivot connecting said frames together substantially in the median line of the harrow, and means operable to adjust said pivot transversely while said frames are pivotally connected to adjust the normal position of the rear frame relatively to the front frame.

7. A disk harrow comprising in combination a front frame, disk gangs connected with said frame, a rear frame pivotally connected permanently with the front frame, disk gangs connected with said rear frame, and means for adjusting the pivot transversely with respect to one of the frames while they are pivotally connected.

8. A disk harrow comprising in combination a front frame having disk gangs connected therewith, a rear frame having disk gangs connected therewith, a vertically swinging coupling pivotally connecting the frames for relative lateral swinging, and means for positively moving the coupling to adjust such pivotal connection transversely of the machine.

9. A disk harrow comprising in combination a front frame, disk gangs connected with said frame, a rear frame, disk gangs connected with said rear frame, means comprising a vertical pivot connecting the two frames to swing angularly relatively to each other and to swing vertically relatively to each other, and spring tensioned means acting normally to hold said frames against angular swinging with respect to each other.

10. A disk harrow comprising in combination a front frame, disk gangs connected with said frame, a rear frame, disk gangs connected with said rear frame, a laterally adjustable vertical pivot connecting said frames and arranged to permit angling thereof relatively to each other, and a spring acting to normally hold said frames against angular movement with respect to each other.

11. A tandem disk harrow comprising front and rear frames, disk gangs connected with said frames respectively, a substantially vertical pivot for coupling said frames together in tandem relation with each other, and means for positively moving said pivot transversely of the machine.

12. A tandem disk harrow comprising front and rear frames, disk gangs connected with said frames respectively, a substantially vertical pivot for coupling said frames together in tandem relation with each other, and eccentric means for positively moving said pivot transversely of the machine.

13. A disk harrow comprising in combination a front frame, disk gangs connected with said frame, a rear frame, disk gangs connected with said rear frame, means pivotally connecting said frames together to swing angularly relatively to each other about a vertical axis, and to swing vertically relatively to each other about a horizontal axis, and means supported by the front frame and operable to adjust the cutting angle of the rear gangs independently of the adjustment of the cutting angle of the front gangs.

14. A disk harrow comprising in combination a front frame, disk gangs connected with said frame, a rear frame, disk gangs connected with said rear frame, means pivotally connecting said frames together to swing angularly relatively to each other about a vertical axis, and to rock relatively to each other about a longitudinal axis, and means supported by the front frame and operable to adjust the cutting angle of the rear gangs independently of the adjustment of the cutting angle of the front gangs.

15. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, to swing vertically relatively to each other about a transverse horizontal axis, and to rock relatively to each other about a longitudinal axis, and means supported by the front frame and operable to adjust the cutting angle of the rear gangs independently of the adjustment of the cutting angle of the front gangs.

16. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, means mounted on the rear frame for adjusting the cutting angle of the rear gangs and holding said gangs in their different positions of adjustment, and means mounted on the front frame for actuating the adjusting means of the rear gangs.

17. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and connected with the rear gangs for adjusting the cutting angle thereof, means mounted on the rear frame for operating said lever and holding it in its different positions of adjustment, and means mounted on the front frame for actuating said operating means.

18. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and connected with the rear gangs for adjusting the cutting angle thereof, a shaft mounted on the rear frame for operating said lever and holding it in its different positions of adjustment, means carried by the rear frame for holding said shaft against endwise movement, and a shaft mounted on the front frame and connected with said first-mentioned shaft for actuating the same.

19. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and connected with the rear gangs for adjusting the cutting angle thereof, a shaft mounted on the rear frame for operating said lever and holding it in its different positions of adjustment, means carried by the rear frame for holding said shaft against endwise movement, and an actuating shaft mounted on the front frame and connected with said first-mentioned shaft by a universal joint disposed substantially in vertical alinement with the pivotal connection of said frames.

20. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, connections adapted to be separately actuated to positively adjust in either direction the cutting angle of the front and rear gangs, respectively, and actuating devices supported by the front frame and operable independently of each other to actuate said connections separately and in either direction.

21. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, gang adjusting levers mounted respectively on the front and rear frames, and operable to adjust the front and rear gangs, respectively, in either direction, and actuating devices supported by the front frame and operable independently of each other to actuate said levers separately and in either direction.

22. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, actuating devices supported by the front frame and separately operable to adjust the cutting angle of the front and rear gangs respectively, gang adjusting levers mounted respectively on the front and rear frames and connected with the front and rear gangs, respectively, and means operatively connecting the rear lever with one of said actuating devices, said connecting means comprising a rotary shaft mounted on the rear frame and having a screw connection with said rear lever, and a rotary shaft mounted on the front frame and connected with said first-mentioned shaft by a universal coupling.

23. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and operable to adjust the cutting angle of the rear gangs, an actuating device supported by the front frame, and means operatively connecting said actuating device with said lever, comprising a rotary shaft mounted on the rear frame and having a screw connection with said lever, and a rotary shaft mounted on the front frame and connected with said first-mentioned shaft by a universal coupling.

24. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and operable to adjust the rear gangs positively in either direction, an actuating device supported by the front frame, and means operatively connecting said actuating device with said lever, comprising a rotary shaft mounted on the rear frame and having a screw connection with said lever, and a rotary shaft mounted on the front frame and connected with said first-mentioned shaft by a universal coupling.

25. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and operable to adjust the cutting angle of the rear gangs, an actuating device supported on the front frame, and means operatively connecting said actuating device with said lever, comprising a rotary shaft mounted on the rear frame and having a screw connection with said lever, and a rotary shaft mounted on the front frame and connected with said first-mentioned shaft by a universal coupling, said universal coupling being disposed substantially in vertical alinement with the pivotal connection of said front and rear frames.

26. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and operable to adjust the rear gangs positively in either direction, an actuating device supported by the front frame, and means operatively connecting said actuating device with said lever, comprising a rotary shaft mounted on the rear frame and having a screw connection with said lever, and a rotary shaft mounted on the front frame and connected with said first-mentioned shaft by a universal coupling, said universal coupling being disposed substantially in vertical alinement with the pivotal connection of said front and rear frames.

27. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and operable to adjust the cutting angle of the rear gangs, an actuating device supported on the front frame, means operatively connecting said actuating device with said lever, comprising a rotary shaft mounted on the rear frame and having a screw connection with said lever, and a rotary shaft mounted on the front frame and connected with said first-mentioned shaft by a universal coupling, and independently operable means mounted on the front frame for adjusting the cutting angle of the front gangs.

28. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, a gang adjusting lever mounted on the rear frame and operable to adjust the rear gangs positively in either direction, an actuating device supported by the front frame, means operatively connecting said actuating device with said lever, comprising a rotary shaft mounted on the rear frame and having a screw connection with said lever, and a rotary shaft mounted on the front frame and connected with said first-mentioned shaft by a universal coupling, and independently operable means mounted on the front frame for adjusting the cutting angle of the front gangs.

29. A disk harrow comprising in combination a front frame, disk gangs connected with said frame, a rear frame, disk gangs connected with said rear frame, means pivotally connecting said frames together to swing angularly relatively to each other about a vertical axis, a gang adjusting lever mounted on the rear frame, connections operable by said lever to adjust the cutting angle of the rear gangs positively in either direction, and means having a support on the front frame and operatively connected with said lever for actuating the same.

30. In a disk harrow, the combination of a front frame, the gangs of disks adjustably connected thereto, a rear frame, gangs of disks adjustably connected thereto, a rotary shaft on the rear frame to adjust the rear gangs and held against lateral movement relatively to said rear frame, a rotary shaft on the front frame for actuating the shaft on the rear frame, said two shafts being universally coupled together and the rear shaft swinging laterally relatively to the front shaft.

31. In a disk harrow, the combination of the front frame, the gangs of disks adjustably connected thereto, the rear frame connected to the front frame to swing laterally relatively thereto around a vertical axial line, two approximately horizontal shafts rotatably mounted respectively on the said frames and universally coupled together, and means supported on the front frame operable to simultaneously rotate said shafts to adjust the rear gangs, the rear shaft swinging laterally with the rear frame relatively to the front shaft.

32. In a disk harrow, a front frame, gangs of disks adjustably connected thereto, a rear frame coupled to the front frame to turn horizontally about a vertical axial line, gangs of disks adjustably connected to the rear frame, a rotary shaft mounted on the rear frame for adjusting the rear gangs, a rotary shaft on the front frame, and a universal coupling joining the ends of the two shafts and positioned in said vertical line around which the rear frame swings horizontally.

33. In a disk harrow, the combination of the front frame, the gangs of disks adjustably connected thereto, the rear frame coupled to the front frame to swing horizontally about a vertical axial line, the shaft mounted on the rear frame in a longitudinal vertical plane fixed relatively to said frame, the shaft on the front frame mounted in a vertical plane fixed relatively to said frame, manual means at the front end of the front shaft for rotating the shafts, and a universal coupler joining the two shafts and positioned in the vertical line around which the rear frame swings.

34. In a disk harrow, the combination of a front frame, gangs of disks adjustably connected thereto, a rear frame pivotally connected to the front frame to swing laterally relative thereto, gangs of disks adjustably connected to the rear frame, power transmitting parts mounted on the front and rear frames respectively and connected with the respective gangs, power operative devices unitarily supported rotatably on the front frame and connected to said power transmitting parts respectively, and means independently operable to actuate said power devices and transmitting parts whereby either the front or rear gangs are independently adjustable.

35. In a disk harrow, the combination of a front frame, gangs of disks adjustably connected thereto, a rear frame pivotally connected to the front frame to swing laterally relatively thereto, gangs of disks adjustably connected to the rear frame, power transmitting parts mounted on the front and rear frames respectively and connected with the respective gangs, and power mechanism supported on the front frame and connected with said transmitting parts to positively move the latter fore and aft to adjust the front or rear gangs.

36. In a disk harrow, the combination of front and rear harrow units pivotally connected together for angular swinging relatively to each other about a vertical axis, yielding means normally holding said units against such angular swinging in either direction from their normal position, said means being operable by steering force tending to change the line of travel of the harrow to permit such swinging, and means operable to adjust the normal operating position of the rear harrow unit transversely relatively to the front harrow unit.

37. In a disk harrow, the combination of front and rear harrow units pivotally connected together for angular swinging relatively to each other about a vertical axis, yielding means normally holding said units against such angular swinging in either direction from their normal position, said means being operable by steering force tending to change the line of travel of the harrow to permit such swinging, and means operable to adjust the pivotal connection between said harrow units transversely with respect to one of said units.

38. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, means mounted on the rear frame for positively adjusting in either direction the cutting angle of the rear gangs, and means supported by the front frame for actuating the adjusting means of the rear gangs.

39. A disk harrow comprising in combination a front frame, disk gangs adjustably connected with said frame, a rear frame, disk gangs adjustably connected with said rear frame, means pivotally connecting said frames together to swing angularly relatively to each other about a vertical axis, means mounted on the rear frame for positively adjusting in either direction the cutting angle of the rear gangs and holding said gangs in their different positions of adjustment, and means supported by the front frame for actuating the adjusting means of the rear gangs.

40. In a tandem disk harrow, the combination of front and rear units, and draft connections between said units arranged to permit angling thereof relatively to each other comprising spring-actuated devices tending to hold said units in normal relation to each other.

41. In a tandem disk harrow, the combination of front and rear units, draft connections between said units arranged to permit angling thereof relatively to each other comprising spring-actuated devices tending to hold said units in normal relation to each other, and means controlled by the turning of one of said units laterally for increasing the spring power applied to said devices effective to restore said units to their normal relation to each other.

42. In a tandem disk harrow, the combination of front and rear units, draft connections between said units arranged to permit angling thereof relatively to each other comprising spring-actuated devices tending to hold said units in normal relation to each other, and means operable to adjust the normal operating position of the rear harrow unit transversely relatively to the front harrow unit.

43. In a tandem disk harrow, the combination of front and rear units, and draft connections between said units arranged to permit angling thereof relatively to each other comprising yielding means normally holding said units against angular swinging in either direction from their normal position, said means being operable by steering force tending to change the line of travel of the harrow to permit such swinging.

44. In a tandem disk harrow, the combination of front and rear units, and draft connections between said units arranged to permit angling thereof relatively to each other comprising yielding means normally holding said units against angular swinging in either direction from their normal position, said means being operable by steering force tending to change the line of travel of the harrow to permit such swinging, and means operable to adjust the normal operating position of the rear harrow unit transversely relatively to the front harrow unit.

45. In a disk harrow a front frame, gangs of disks connected with said frame and adjustably movable fore and aft, gang adjusting devices carried by said frame and adapted to be operated to adjust said gangs, a rear frame pivotally coupled with the front frame, gangs of disks connected with said rear frame and adjustably movable fore and aft, gang adjusting devices carried by said rear frame for adjusting said rear gangs and holding them in their different positions of adjustment, and unitarily mounted independently operable means for operating said gang adjusting devices.

46. In a disk harrow a front frame, gangs of disks connected with said frame and adjustably movable fore and aft, gang adjusting devices carried by said frame and adapted to be operated to adjust said gangs, a rear frame pivotally coupled with the front frame, gangs of disks connected with said rear frame and adjustably movable fore and aft, self-locking gang adjusting devices carried by said rear frame for adjusting said rear gangs and holding them in their different positions of adjustment, and independently operable coaxially mounted means for operating said gang adjusting devices.

CHARLES H. WHITE.